United States Patent
Stuhr

(10) Patent No.: US 7,051,974 B2
(45) Date of Patent: May 30, 2006

(54) PIVOTING AIRCRAFT WING AND ASSOCIATED METHOD

(75) Inventor: Victor Ken Stuhr, Seattle, WA (US)

(73) Assignee: The Boeing Company, Chicago, IL (US)

( * ) Notice: Subject to any disclaimer, the term of this patent is extended or adjusted under 35 U.S.C. 154(b) by 227 days.

(21) Appl. No.: 10/864,114

(22) Filed: Jun. 9, 2004

(65) Prior Publication Data

US 2005/0274844 A1 Dec. 15, 2005

(51) Int. Cl.
*B64C 3/38* (2006.01)
(52) U.S. Cl. ..................... 244/46; 244/129.1
(58) Field of Classification Search .............. 244/46, 244/129.1, 131; 384/112, 110, 123, 305, 384/424
See application file for complete search history.

(56) References Cited

U.S. PATENT DOCUMENTS

| 93,348 | A | * | 8/1869 | Robirds ..................... 384/424 |
|---|---|---|---|---|
| 2,231,037 | A | * | 2/1941 | Taylor ........................ 267/280 |
| 2,922,601 | A | * | 1/1960 | Wallis ......................... 244/46 |
| 3,023,984 | A | * | 3/1962 | Brennan ...................... 244/46 |
| 3,053,484 | A | | 9/1962 | Alford, Jr. et al. |
| 3,133,716 | A | | 5/1964 | Halliwell |
| 3,381,918 | A | | 5/1968 | Jacquart et al. |
| 3,405,280 | A | | 10/1968 | Willox |
| 3,405,891 | A | | 10/1968 | Jacquart et al. |
| 3,447,761 | A | | 6/1969 | Whitener et al. |
| 3,606,978 | A | * | 9/1971 | Whitener ..................... 244/46 |
| 3,764,093 | A | * | 10/1973 | Richardson ................. 244/46 |
| 3,971,535 | A | | 7/1976 | Jones |
| 4,212,441 | A | | 7/1980 | Ascani, Jr. et al. |
| 6,644,599 | B1 | | 11/2003 | Perez |

OTHER PUBLICATIONS

MSN Groups; Space Cowboy Saloon; Demonstrating the "swing-wing"; pp. 1-7; Feb. 11, 2004; http://groups.com/spacecowboysaloon/bellx5,msnw.

U.S. Centennial of Flight Commission; Variable-Sweep Wings; pp. 1-5; Feb. 11, 2004; http://www.centennialofflight.gov/essay/Evolution_of_Technology/variable_sweep_wings/Techll.htm.

* cited by examiner

*Primary Examiner*—Galen Barefoot
(74) *Attorney, Agent, or Firm*—Alston & Bird LLP

(57) ABSTRACT

A pivoting aircraft wing and associated system and method are provided. The pivoting aircraft wing includes a wing member, a carry-through structure, and a spar box assembly pivotally connected to the carry-through structure. The spar box assembly extends longitudinally within the wing member. The spar box assembly comprises a spar box and a bearing support structure attached to the spar box. The aircraft wing further includes a plurality of bearings disposed within a plurality of bearing races defined by the bearing support structure and carry-through structure. The plurality of bearing races advantageously define an arcuate path of rotation such that the wing member is capable of rotating about a virtual axis of rotation.

26 Claims, 6 Drawing Sheets

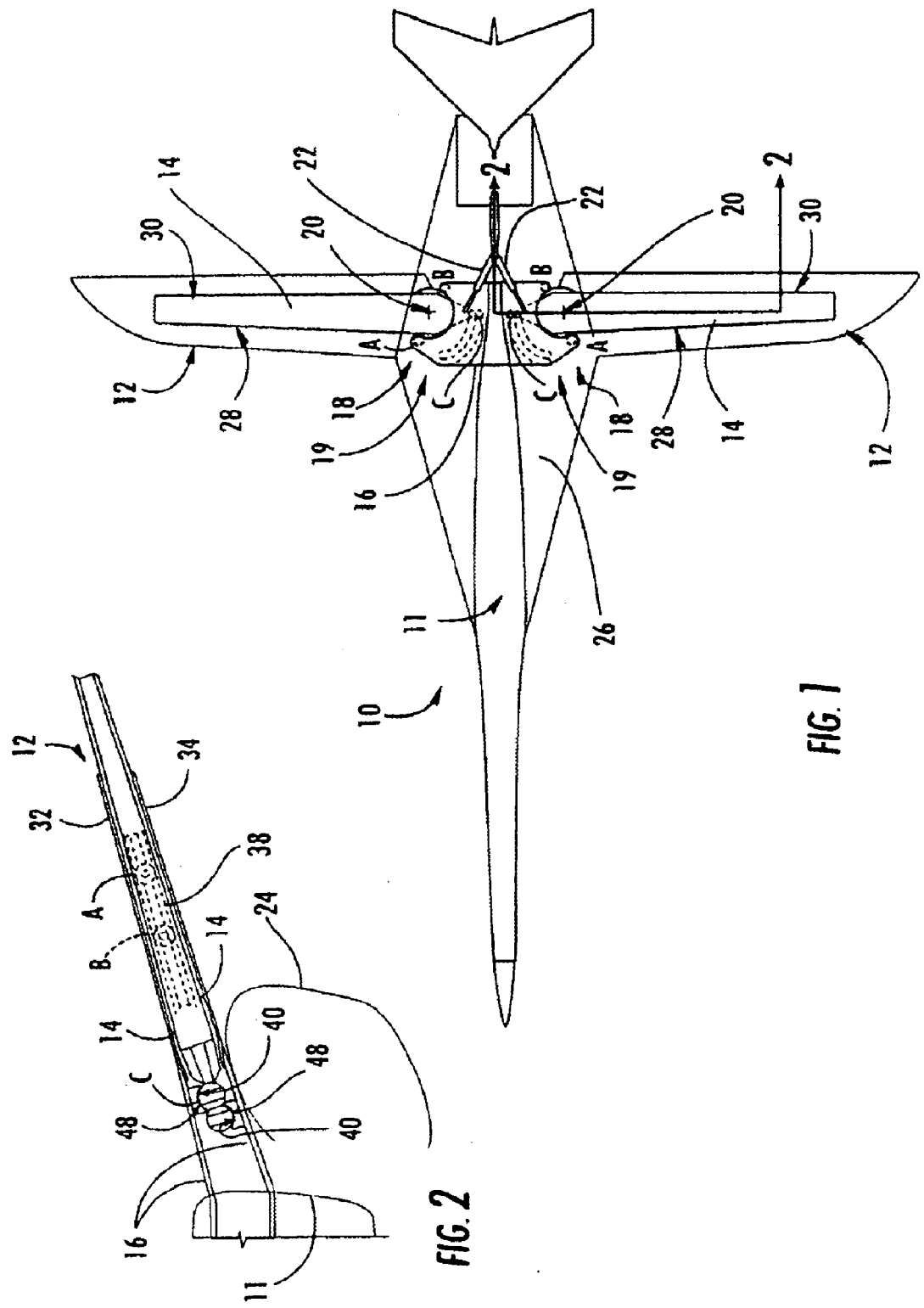

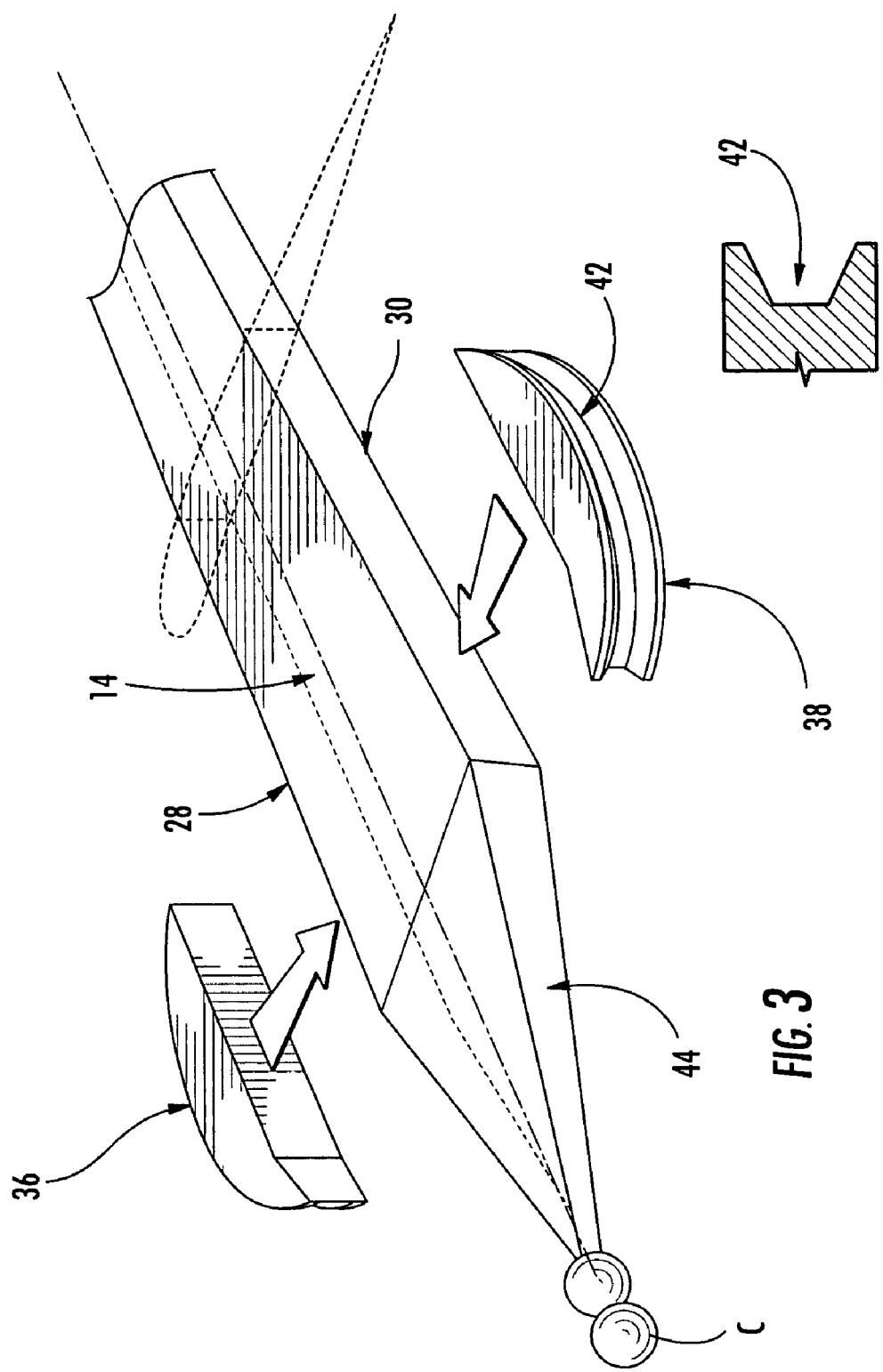

PIVOTING AIRCRAFT WING AND ASSOCIATED METHOD

BACKGROUND OF THE INVENTION

1) Field of the Invention

The present invention relates to variable sweep aircraft and, more particularly, to a pivoting aircraft wing capable of varying the sweep angle of an aircraft, as well as an associated system and method.

2) Description of Related Art

It is well known that wing design plays an instrumental role in optimizing lift and drag during flight in response to various conditions. Wing design becomes especially important depending on whether the wing is subjected to subsonic, transonic, or supersonic speeds. Decreasing drag involves balancing several different parameters, including, for example, speed, altitude, angle of attack, wing dimensions, and the profile of the airfoil.

Wings having a high span are preferred for takeoff and landing where drag is substantially lower than wings having a low span. Because the aspect ratio is defined as the ratio of the wing span to the average chord length, longer and narrower wings will have better lift than shorter and wider wings. However, swept wings are preferred over high aspect ratio unswept wings at transonic and supersonic speeds because drag is significantly reduced. Even though swept wings can also maintain the required lift at these higher speeds, swept wings do not perform well at subsonic speeds. Therefore, swept wing aircraft are generally required to have lower sweep angles than would typically be required for transonic and supersonic speeds in order to make takeoff and landing feasible.

Therefore, variable sweep aircraft wings have been developed that are able to balance the tradeoffs of using either a high aspect ratio, unswept wing, or a lower aspect ratio, swept wing. Aircraft with variable sweep wings can modify the wing configuration from a high span during takeoff, subsonic cruise, or landing, to an increased sweep during supersonic speeds. Advantageously, aircraft with variable sweep wings are able to decrease weight due to an increase in fuel efficiency and may require smaller engines to accelerate the aircraft to supersonic speed, in addition to being capable of operating over a wide range of speeds, decreasing noise due to decreased drag, and shortening takeoff and landing field lengths.

For example, U.S. Pat. No. 4,212,441 to Ascani, Jr. et al ("Ascani") discloses a wing pivot assembly for a variable sweep aircraft. Ascani discloses a pivot assembly located at the end of each wing adjacent to the fuselage. The pivot assembly includes a pivot pin that utilizes a "pin within a pin" design, where either pin can carry the load limit. A pair of outboard lugs, i.e., plates, located between the wing and the pivot pin acts to carry the wing bending moment loads into the pin, while a second pair of inboard lugs located between the pivot pin and a carry-through structure carry the wing bending moment loads into the carry-through structure. In addition, two bearing assemblies connecting to the outboard lugs facilitate rotating of the pivot pin and also transmit wing bending moment loads from the outboard lugs into the pivot pin. Ascani also employs a shear bearing and the "truss concept," which includes canting the inboard and outboard lugs at an angle, to counter axial shear loading.

However, previous variable sweep aircraft, such as that discussed above, have inherent disadvantages, namely increased weight, which counteracts any advantages associated with varying the sweep of the wings. In addition, the pivot pin design and excess weight offer a poor mechanical advantage and offset load paths. The support structure surrounding the pivot pin may extend quite far out into the outboard wing box in order to direct the loads away from a wide wing box geometry and toward the pin in a way that does not exceed material strength limits. The same is true of the inboard bearing support structure. Therefore, in addition to a potentially large and heavy pivot pin, the supporting structures add even more weight in transferring loading from the wings to the pivot pin and further inboard to a carry-through structure. Furthermore, the thickness of the wing is required to be at least as thick as the pivot pin, and even wider to accommodate the surrounding support structures, which also increases weight and drag, especially for supersonic aircraft.

It would therefore be advantageous to provide a lighter weight pivoting aircraft wing that can vary the wing sweep angle of an aircraft. In addition, it would be advantageous to provide a pivoting aircraft wing that can vary the sweep angle without sacrificing lift and drag. Finally, it would be advantageous to provide a pivoting aircraft wing that enables an aircraft to travel at supersonic speeds without increasing drag.

BRIEF SUMMARY OF THE INVENTION

The invention addresses the above needs and achieves other advantages by providing a variable sweep aircraft that is able to change the orientation of its wings from an unswept position at low speeds, takeoff, and landing to a swept position at higher speeds. Thus, the variable sweep aircraft is able to pivot its wings about a virtual axis of rotation to any number of sweep angles depending on the speed and other circumstances to reduce drag. The pivoting aircraft wing of the present invention is able to reduce the weight of the variable sweep aircraft relative to conventional variable sweep aircraft, which consequently reduces drag.

In one embodiment, the pivoting aircraft wing includes a wing member, a carry-through structure, and a spar box assembly pivotally connected to the carry-through structure. The spar box assembly extends longitudinally within the wing member. The spar box assembly includes a spar box and at least one bearing support structure attached to the spar box. In one variation of the present invention, one end of the spar box tapers to a point proximate to the third bearing and defines a generally triangular shape. The aircraft wing further includes a plurality of bearings disposed within a plurality of bearing races defined by the bearing support structure and carry-through structure. The plurality of bearing races advantageously define an arcuate path of rotation such that the wing member is capable of rotating about a virtual axis of rotation. In variations of the present invention, the aircraft wing is capable of pivoting from an unswept position having about 10 degrees of sweep to a swept position having at least 70 degrees of sweep. An actuator connected to the spar box may be employed to pivot the wing member to various sweep angles.

The plurality of bearings may include first, second, and third bearings. The first and second bearings may be attached to the carry-through structure, while the third bearing may be attached to an end of the spar box proximate to the carry-through structure. The spar box assembly may comprise at least a pair of bearing support structures that define respective bearing races in which the first and second bearings are disposed such that the spar box assembly is capable of pivoting about the first and second bearings. Also, a bearing support structure may be attached to the carry-through structure and define at least one bearing race such that the third bearing may be disposed and pivoted within the bearing race. The spar box assembly may advantageously pivot about the plurality of bearings and bearing races to vary the sweep angle of the wing member.

In another embodiment of the present invention, a pivoting aircraft wing system includes a pair of wing members, a fuselage member, and a carry-through structure carried by the fuselage member. The aircraft wing system also includes a pair of spar box assemblies that pivotally connect to the carry-through structure and extend longitudinally within each of the wing members. Each spar box assembly includes a spar box and at least one bearing support structure attached to the spar box. Furthermore, the aircraft wing system includes a plurality of bearings disposed within a plurality of bearing races defined by each of the bearing support structures and carry-through structure. The plurality of bearing races defines an arcuate path of rotation such that each of the wing members is capable of rotating about a respective virtual axis of rotation.

The present invention further provides a method of pivoting a pair of aircraft wings on a variable sweep aircraft. The method includes first providing a fuselage member, a carry-through structure carried by the fuselage member, and a pair of spar boxes. Each of the spar boxes are pivotally connected to the carry-through structure and extend longitudinally within each of a pair of wing members such that each of the wing members are coupled to each of the spar boxes. The method further includes pivoting each of the wing members about a virtual axis of rotation to predetermined sweep angles.

Optionally, the method includes pivoting the wing members about a virtual axis of rotation defined by a plurality of bearings disposed within a plurality of bearing races defined between the carry-through structure and each of the spar boxes. Each of the wing members may be pivoted simultaneously with a respective actuator to predetermined sweep angles, such as a sweep angle of at least 70 degrees.

The present invention therefore provides variable sweep aircraft wings that are capable of being oriented at various sweep angles to reduce drag at different speeds. The combination of varying the aspect ratio and reducing the weight of the variable sweep aircraft wings facilitates a decrease in drag. Weight is reduced by maintaining the bending, torsional, and axial loads in the wing spar box structure, rather than focusing the loading through a single small pivot on each wing. Spreading the loading over a larger area results in a reduction in the structural gauges of the wing, which directly results in weight reduction. Reducing drag, in turn, may reduce noise and fuel consumption because of the smaller engine required, and may decrease the runway length needed for takeoff and landing.

In addition, the variable sweep aircraft wing of the present invention may decrease the effects of sonic booms on commercial flights, as well as facilitate over-land supersonic commercial flights. Commercial flights traveling at supersonic speeds have been generally limited to flights over water due to the effects of sonic booms on humans; however, the configuration of the variable sweep aircraft wing of the present invention may make low-boom flight more achievable. This feature is due to the unswept and swept positions the aircraft wing may obtain, which permits the aircraft to takeoff and land at low speeds with reasonable field lengths, as well as pivot to a more swept position during higher speeds than fixed wing supersonic aircraft can achieve because of their low speed requirements.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a top view of a variable sweep aircraft according to one embodiment of the present invention, illustrating the wings in an unswept position;

FIG. 2 is an enlarged section view taken through line 2—2 illustrating the virtual axis of rotation of the variable sweep aircraft shown in FIG. 1;

FIG. 3 is an enlarged exploded view of one end of a spar box assembly shown in FIG. 1;

FIG. 3A is an enlarged cross-sectional view of a bearing race shown in FIG. 3;

DETAILED DESCRIPTION OF THE INVENTION

Figure 1A:
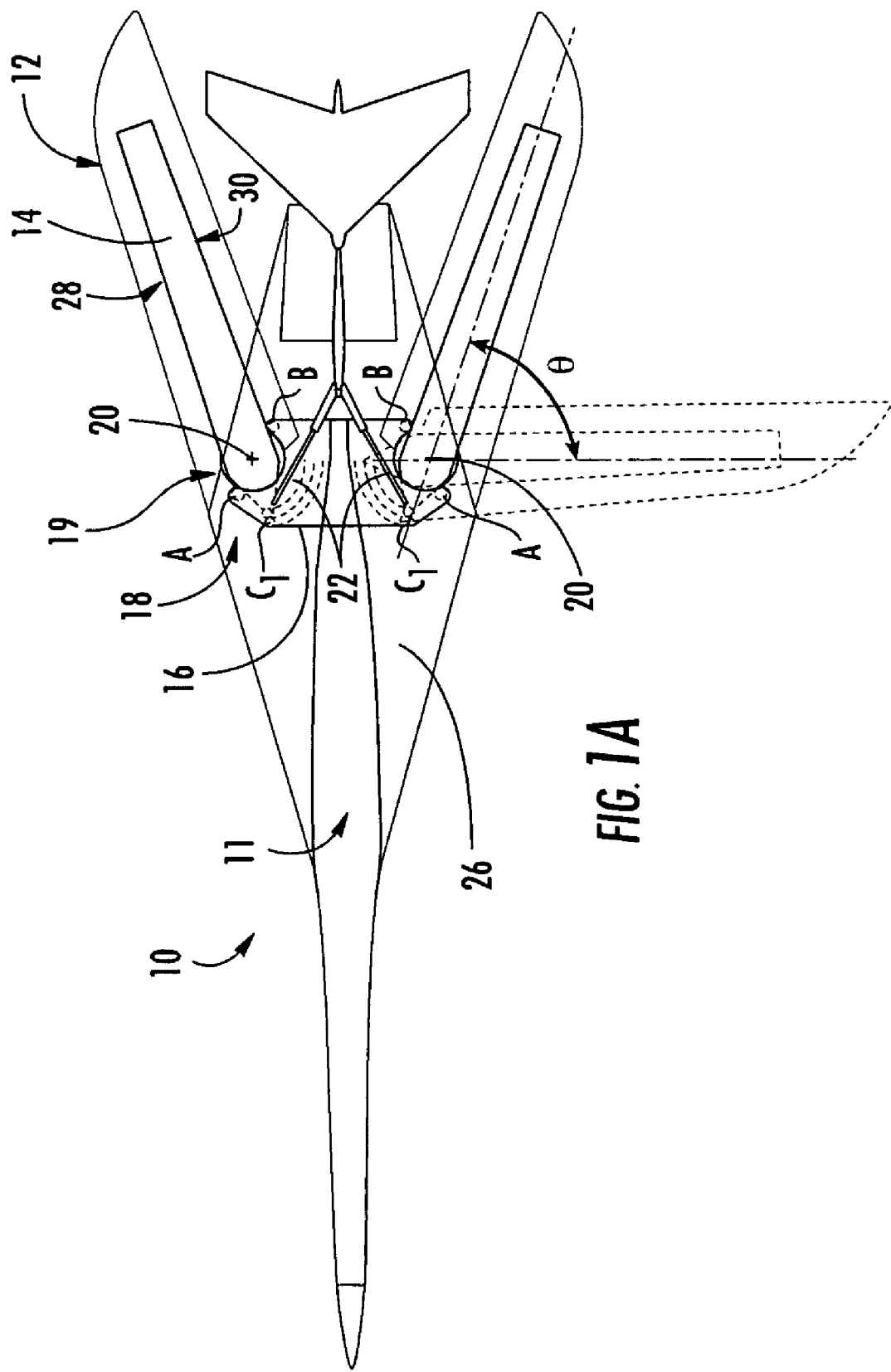
FIG. 1A is another top view of the variable sweep aircraft of FIG. 1, illustrating the wings in a swept position.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings and, in particular to FIG. 1, there is shown a variable sweep aircraft 10. The term "variable sweep aircraft" is not meant to be limiting and may be any aircraft capable of varying the sweep angle of the wings such that the aspect ratio may be increased and decreased depending on the flight speed and other desired parameters. Thus, variable sweep aircraft could be a variable geometry aircraft, or any aircraft that includes wings that may pivot, rotate, swivel, or otherwise change the orientation of the wings to various sweep angles. As a result, the variable sweep aircraft 10 is capable of flying from subsonic to supersonic speeds with improved lift and drag properties over a wide range of speeds.

In one embodiment of the present invention FIG. 1 illustrates a variable sweep aircraft 10 including a fuselage 11 and a pair of wings 12 extending in opposite directions from the fuselage. Each of the wings 12 is carried by, or otherwise attached to, a structural spar box 14. The spar boxes 14 are pivotally attached to a carry-through structure 16. Bearings, generally indicated at 18, and races, generally indicated at 19, are located between each of the spar boxes 14 and the carry-through structure 16 and define a virtual axis of rotation 20, as will be explained more fully below. Each of the wings 12 rotates about a respective virtual axis of rotation 20. As shown in FIG. 1A, actuators 22 are connected to each of the spar boxes 14 and are operable to rotate the wings about the virtual axis of rotation 20 to various sweep angles θ.

The actuators 22 could be any hydraulic, pneumatic, or similar mechanism that is capable of providing sufficient force to pivot each of the wings 12. Thus, the actuators 22 could be electrically, mechanically, or electro-mechanically controlled, and are capable of closely controlling the sweep angles θ to pivot the wings 12 to predetermined sweep angles. Preferably the actuators 22 are capable of pivoting each of the wings 12 simultaneously to maintain the stability of the variable sweep aircraft 10 during flight.

As shown in the embodiment of FIG. 2, an engine inlet 24 is located below each of the wings 12 to direct air into the engine to thrust the variable sweep aircraft 10. In one embodiment of the present invention, a turbojet engine with air inlets on both sides of the fuselage 11 could be incorporated with the variable sweep aircraft 10 to provide the aircraft with adequate thrust to reach supersonic speed. In addition, a wing strake 26 extends approximately orthogonal to the fuselage 10 and aft towards each of the wings 12 and carry-through structure 16. Thus, the strake 26 is aligned in the direction of airflow and is generally aligned with each of the wings 12 when the wings 12 are fully swept, as shown in FIG. 1A.

The structural spar boxes 14, as known to those skilled in the art, include a front spar 28 and a rear spar 30, both of which extend vertically within each of the wings 12. The front 28 and rear 30 spars are connected by a pair of horizontal members to form a hollow "box." The spar boxes 14 extend substantially along the length of each of the wings 12 to provide the main structural support for the wings 12 and to increase the torsional rigidity of the wings. At one end of the spar boxes 14, the spar boxes include a tapered end 44 having a generally triangular shape, as shown in FIG. 3. Thus, each of the front 28 and rear 30 spars converge and intersect at bearing C. Because each of the spar boxes 14 are connected to the respective wings 12, as the spar boxes are rotated each of the wings are also rotated to vary the sweep angle θ. As a result, the wings 12 follow an arcuate path of rotation about their respective virtual axis of rotation 20.

Generally, an upper skin 32 and a lower skin 34 are carried, or otherwise attached to, each of the spar boxes 14, as shown in FIG. 2. Internal skin stiffeners, stringers, and ribs are typically arranged between the upper 32 and lower 34 skins and along the wings 12 for reinforcement and to define the contour of the airfoil, as known to those skilled in the art. Generally, the stiffeners and stringers extend spanwise within the wings 12, while the ribs extend chordwise. It is understood that any arrangement of spars, skin stiffeners, stringers, or ribs could be used within each of the wings 12 to provide varying amounts of support, wing shapes, or airfoils. For example, the spar boxes 14 could also include a middle spar located between the front 28 and rear 30 spars. Similarly, the spar box 14 could have a shape other than triangular at the end proximate to bearing C, such as a semi-circular or even rectangular.

The carry-through structure 16, as known to those skilled in the art, bridges between the wings 12 and attaches to, or is integral with, the fuselage 11. Thus, the carry-through structure 16 is a major structural element that transfers loading from the wings 12 and spar boxes 14 to, or across, the fuselage 11. The carry-through structure 16 is shown in FIG. 1 as having a curvature that conforms to each virtual axis of rotation 20, and also lies adjacent to the upper 32 and lower 34 skins, as shown in FIG. 2. FIG. 1 also illustrates that the carry-through structure 16 is generally aligned spanwise with the leading edge of the wings 12 when in an unswept position. It is understood that the carry-through structure 16 could be any shape or size to accommodate different sized fuselages 11, wings 12, or spar boxes 14, as well as conform to a variety of virtual axes of rotation.

Referring now to FIGS. 1–3, one advantageous embodiment of the present invention is shown and is described in detail for purposes of example and not of limitation. The variable sweep aircraft 10 of this embodiment is about 155 feet in length, and has a span of approximately 120 feet in an unswept position. The front 28 and rear 30 spars are spaced about 6 feet apart. Also, the variable sweep aircraft 10 has a sweep angle θ of about 10 degrees when unswept, and may rotate to a sweep angle of about 70 degrees.

It should be noted that the aforementioned features of the exemplary embodiment of the variable sweep aircraft 10 may change as they depend on many factors. For example, the fuselage 11 could be various cross sections and sizes depending on the type of aircraft desired. Additionally, the profile of the airfoil could be any suitable airfoil, symmetric or asymmetric, having any number of chord lengths, leading edge radii, trailing edge angles, and thicknesses, as known to those skilled in the art, depending on the drag and lift properties desired. Although it is preferred that the wings 14 assume a sweep angle θ ranging from about 10 to 70 degrees, it is understood that any specified angle could be employed with the variable sweep aircraft 10 in alternative embodiments of the present invention to achieve a desired drag coefficient.

The bearings 18 and bearing races 19 advantageously define a virtual axis of rotation 20 for each of the wings 12. As illustrated in the embodiment shown in FIG. 3, bearing support structure 36 is attached to the vertical face of the front spar 28, while bearing support structure 38 is attached to the vertical face of the rear spar 30. Each of the bearing support structures 36, 38 defines a race 42 in its outer surface, i.e., the surface facing away from the spar box 14, as shown in FIGS. 2, 3A, that engages a respective one of bearings A, B. Bearing A is a single ball attached to the carry-through structure 16 that fits within the bearing race 42 defined in bearing support structure 36 such that each of the spar boxes 14 may pivot when rotated to a specified sweep angle θ. Similarly, bearing B is a ball that is attached to the carry-through structure 16 that allows the spar boxes 14 to pivot along the races within the bearing race 42 defined in bearing support structure 38. Thus, the bearing support structures 36, 38 provide a smooth radial path in which each of the bearings A, B ride when the spar box is rotated. It should be noted that bearings A, B and bearing support structure 38 are shown on FIG. 2 in dashed lines for illustrative purposes only, as the view of section 2—2 would not otherwise depict bearings A, B and bearing support structure 38. Bearings A, B could be attached to the carry-through structure 16, and bearing support structures 36, 38 attached to the spar boxes 14, by any suitable means, such as by welding, fastening, riveting, and the like, that is capable of withstanding the loads endured during flight.

Bearing C is shown in FIGS. 2–3 as having two adjacent balls that are attached to the tapered end 44 of the spar boxes 14. A bearing support structure 48 is attached to the carry-through structure 16, and bearing C may be positioned with a ball in each of a pair of races 40 defined by the bearing support structure such that bearing C may pivot within the pair of races when the spar boxes 14 are rotated. Bearing C pivots to position $C_1$ while in a fully swept position, and thus follows an arcuate path of rotation, as shown in dashed lines on FIG. 1A. Bearing C could be attached to the spar boxes 14, and bearing support structure 48 attached to the carry-through structure 16, by any suitable means, such as by welding, fastening, riveting, and the like, that is capable of withstanding the loads endured during flight.

Thus, the bearings 18 and bearing races 19 define a virtual axis of rotation 20 for each of the wings 12 in one advantageous embodiment of the present invention. The term "virtual" axis of rotation 20 is used because there is no actual bearing, bearing race, or other device at the specific point about which the wings 12 pivot. However, each of the wings 12 pivots about its respective virtual axis of rotation 20, which acts to distribute loading away from a single pivot point.

Figure 4:
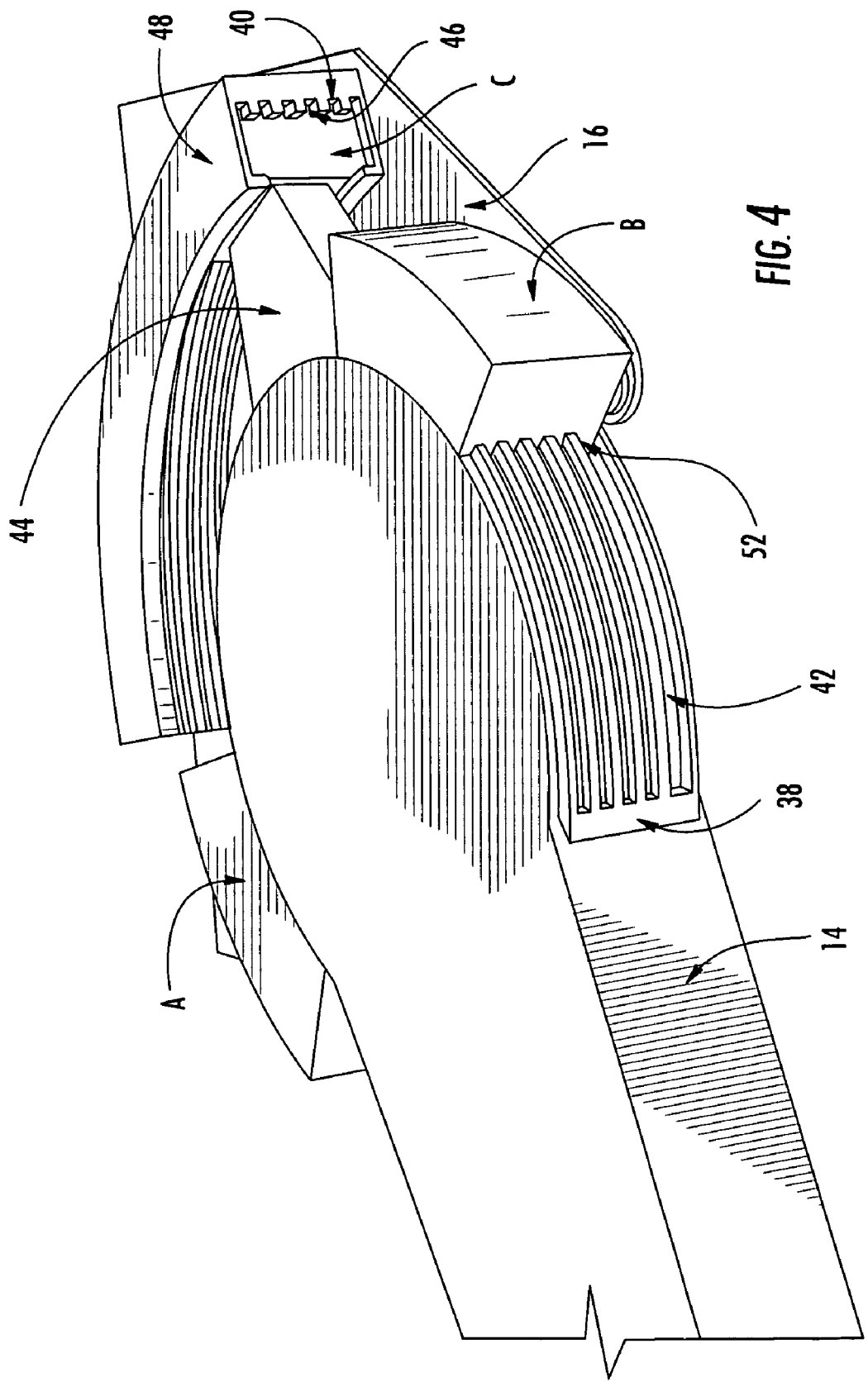
FIG. 4 is an enlarged perspective view of a spar box, bearing support structures, and bearings according to another embodiment of the present invention.
Figure 5:
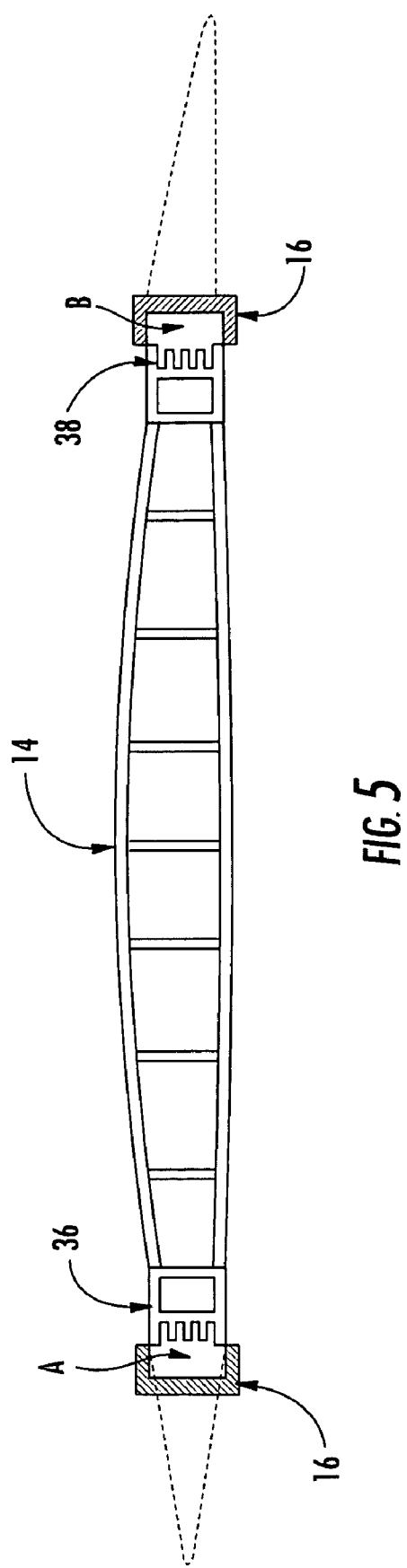
FIG. 5 is a cross-sectional view of the spar box shown in FIG. 4, with the section taken through bearings A, B, and the view facing inboard.
Figure 6:
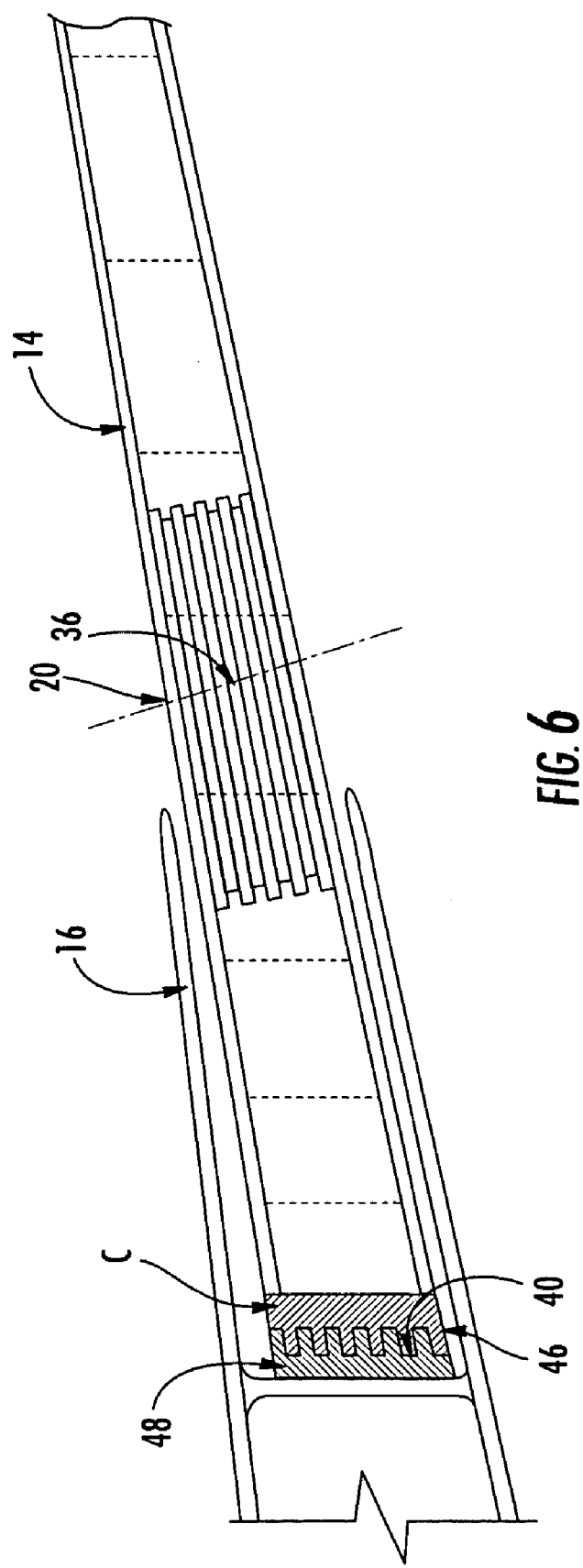
FIG. 6 is another cross-sectional view of the spar box shown in FIG. 4 in an unswept position, with the section taken through bearing C, and the view facing aft.

FIGS. 4–6 illustrate another embodiment of the present invention. Each of the spar boxes 14 includes a bearing C that is integrally formed with the spar box. Bearing C includes several teeth 46 that extend outwardly and engage bearing races 40 defined in a bearing support structure 48. The bearing support structure 48 is attached to the carry-through structure 16. As shown in FIG. 4, bearing C is located proximate to a tapered end 44, wherein the tapered end extends from the end of the spar box 14 to bearing C. Bearing support structures 36, 38 are attached to the spar box 14 and also include several bearing races 42 that may engage the teeth 52 extending from bearings A, B. As before, bearings A, B are attached directly to the carry-through structure 16, as shown in FIG. 5. As a result, the bearing support structures 36, 38, 48 define respective bearing races 40, 42 that are arranged in an arc so that the teeth 46, 52 of each of the respective bearings may slide within the bearing races to rotate the spar boxes 14 about a respective virtual axis of rotation 20.

The wings 12 generally experience shear, torsional, and bending loading during flight. Bearings A, B, C transfer loading to the carry-through structure 16 and fuselage 11 and vice versa. Specifically, bearings A, B transfer shear loading due to drag and lift, as well as torsional loading due to the wing pitching moment. The lever arm of the torsional load in the unswept and swept positions would be equivalent to the distance between bearings A, B in approximately a chordwise direction. Bearing C transfers the bending moment caused by lift and the lift distribution along each of the wings 12. The bending moment arm would be reacted over the spanwise distance from a line between bearings A and B to bearing C when the wings 12 are in an unswept position, while the moment arm would be reacted over a longer arm from position $C_1$ to bearing B in a swept position. The bending moment in bearing C is generally much higher than the loading experienced at bearings A, B. The configuration of bearings A, B, C distributes the loading so that no single bearing or pivot point experiences all of the loading at any given instant.

The wings 12 could be any suitable material, but is preferably a lightweight yet high strength aluminum or composite suitable for aircraft wings. Similarly, the spar boxes 14, carry-through structure 16, bearings 18, and bearing races 19 are preferably all lightweight and manufactured from a composite, ceramic, or metallic material. The composite material could be any suitable particle-reinforced, sandwiched, laminated composite, or fiber-reinforced material, such as a carbon-fiber reinforced plastic. In one embodiment, the bearings 18 include a metallic or ceramic backing and have a Teflon™ material (commercially available from E.I. du Pont de Nemours and Company) surface where the bearings engage the bearing races 19. However, it is understood that various composites, including metals and their alloys, could be incorporated in additional embodiments of the present invention.

Although the wings 12 are illustrated in one embodiment of the present invention as having three pivot points about bearings A, B, C to define the virtual axis of rotation 20, it is understood that alternative configurations could be employed and still be within the scope of the present invention. For example, any number of bearings 18, bearing races 19, and bearing support structures 36, 38, 48 could be used to define the virtual axis of rotation 20. In addition, the bearings 18, bearing races 19, and bearing support structures 36, 38, 48 could be arranged such that the virtual axis of rotation 20 may be located in any desirable location between the spar box 14 and carry-through structure 16.

Although various elements, such as the bearings 18 and bearing supports structures 36, 38, 48, are described as being "attached" in various embodiments, it is understood that the bearings 18, bearing races 19, and bearing support structures 36, 38, 48 could be integrally molded, machined, or otherwise formed as discrete elements, in either or both of the spar boxes 14 and carry-through structure 16, and still be "attached" for purposes of the present invention and still be capable of withstanding the loading imposed on the variable sweep aircraft 10 during flight. For example, the bearing support structures 36, 38 could be integral with the spar boxes 14, or bearings A, B could be integral with the carry-through structure 16. Additionally, it is understood that in alternative embodiments the spar box 14 could carry all of the bearings 18, while the carry-through structure could define all of the bearing races 19, and vice versa.

Furthermore, although the bearings 18 are shown in FIGS. 1–3 as being spherical, the bearings could be any type or dimension of bearing, such as tapered, cylindrical, or the like, that enable the spar boxes 14 and wings 12 to pivot. It is also understood that the bearings 18 illustrated in FIGS. 4–6 could include any number and dimension of respective teeth 46, 52 to accommodate any number of respective bearing races 19 defined in the respective bearing support structures 36, 38, 48. Similarly, the bearing races 19 could be any type or dimension to accommodate each of the corresponding bearings 18, and could be lubricated in alternative embodiments. It is also understood that each of the bearings 18 and corresponding bearing races 19 could also be different, so that at least one bearing and corresponding bearing race are different than the others.

Advantageously, the configuration of the bearings 18 and bearing races 19 act to distribute the loading about a virtual axis of rotation 20 for each of the wings. This distribution ensures that the weight of the carry-through structure 16 and spar box 14 can be reduced. In addition, because the loading is distributed, the thickness of the wing may also be reduced, which allows for small thickness-to-chord ratios to be employed. For example, in one embodiment of the present invention, the thickness-to-chord ratio is about 0.08 in an unswept position and about 0.025 at about 70 degrees of sweep, which are typical values for aircraft traveling at supersonic speeds. Furthermore, the variable sweep aircraft 10 of the present invention is also capable of traveling at supersonic speeds, and the decreased weight and drag would improve all aspects of performance and make a low-boom configuration more achievable.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A pivoting aircraft wing comprising:
   a wing member;
   a carry-through structure assembly coupled to the wing member, the carry-through structure assembly comprising:
   a carry-through structure;
   a plurality of bearings attached to the carry-through structure; and
   at least one bearing support structure attached to the carry-through structure; and
   a spar box assembly pivotally connected to the carry-through structure assembly and extending longitudinally within the wing member, the spar box assembly comprising:
   a spar box;
   at least one bearing attached to the spar box; and
   a plurality of bearing support structures attached to the spar box
   wherein the bearings of the carry-through structure assembly and spar box assembly are disposed within a plurality of respective bearing races defined by each of the bearing support structures of the spar box assembly and carry-through structure assembly, and wherein the plurality of bearing races define an arcuate path of rotation such that the wing member is capable of rotating about a virtual axis of rotation.

2. A pivoting aircraft wing according to claim 1, wherein the bearings of the carry-through structure assembly and spar box assembly comprise first, second, and third bearings.

3. A pivoting aircraft wing according to claim 2, wherein the first and second bearings are attached to the carry-through structure.

4. A pivoting aircraft wing according to claim 3, wherein the spar box assembly comprises a pair of bearing support structures, and wherein each of the bearing support structures defines at least one respective bearing race.

5. A pivoting aircraft wing according to claim 4, wherein the first and second bearings are disposed within respective ones of the bearing races such that the spar box assembly is capable of pivoting about the first and second bearings.

6. A pivoting aircraft wing according to claim 2, wherein the third bearing is attached to an end of the spar box proximate to the carry-through structure.

7. A pivoting aircraft wing according to claim 6, wherein the end of the spar box tapers to define a generally triangular end proximate to the third bearing.

8. A pivoting aircraft wing according to claim 6, wherein the carry-through structure assembly comprises a bearing support structure attached to the carry-through structure and defining at least one bearing race, and wherein the third bearing is disposed within the bearing race such that the third bearing is capable of pivoting about the bearing race.

9. A pivoting aircraft wing according to claim 1, further comprising an actuator connected to the spar box assembly and operable to pivot the wing member from an unswept position to a swept position about the virtual axis of rotation.

10. A pivoting aircraft wing according to claim 1, wherein the wing member is positioned at a sweep angle of about 10 degrees in an unswept position.

11. A pivoting aircraft wing according to claim 1, wherein the wing member is capable of pivoting to a sweep angle of at least 70 degrees.

12. A pivoting aircraft wing system comprising:
    a pair of wing members;
    a fuselage member;
    a carry-through structure assembly carried by the fuselage member, wherein the carry-through structure assembly comprises:
    a carry-through structure;
    a plurality of bearings attached to the carry-through structure; and
    at least one bearing support structure attached to the carry-through structure; and
    a pair of spar box assemblies, wherein each of the spar boxes is pivotally connected to the carry-through structure assembly and extends longitudinally within a respective wing member, wherein each of the spar box assemblies comprise:
    a spar box;
    at least one bearing attached to a respective spar box; and
    a plurality of bearing support structures attached to a respective one of the spar boxes,
    wherein the bearings of the carry-through structure assembly and each spar box assembly are disposed within a plurality of bearing races defined by each of the bearing support structures of the spar box assembly and carry-through structure assembly, and wherein the plurality of bearing races define an arcuate path of rotation such that each of the wing members is capable of rotating about a respective virtual axis of rotation.

13. A pivoting aircraft wing system according to claim 12, wherein the bearings of the carry-through structure assembly and each spar box assembly comprise first, second, and third bearings for facilitating rotation about a respective virtual axis of rotation.

14. A pivoting aircraft wing system according to claim 13, wherein each of the first and second bearings is attached to the carry-through structure to define the respective virtual axis of rotation.

15. A pivoting aircraft wing system according to claim 14, wherein each of the spar box assemblies comprises a pair of bearing support structures, and wherein each of the bearing support structures defines at least one respective bearing race.

16. A pivoting aircraft wing system according to claim 15, wherein each of the first and second bearings is disposed within a respective bearing race to define a respective virtual axis of rotation such that each of the spar box assemblies is pivotable about the first and second bearings.

17. A pivoting aircraft wing system according to claim 13, wherein each of the third bearings is attached to an end of a respective spar box proximate to the carry-through structure.

18. A pivoting aircraft wing system according to claim 17, wherein the end of each of the spar boxes tapers to define a generally triangular end proximate to each of the third bearings.

19. A pivoting aircraft wing system according to claim 17, wherein the carry-through structure assembly comprises a pair of bearing support structures attached to the car-through structure, and wherein each respective bearing support structure defines at least one bearing race, and wherein each of the third bearings is disposed within a respective bearing race such that each of the third bearings is capable of pivoting about the respective bearing race.

20. A pivoting aircraft wing system according to claim 12, further comprising a pair of actuators, wherein each of the actuators is connected to a respective spar box assembly and is operable to pivot each of the wing members from an unswept position to a swept position about a respective virtual axis of rotation.

21. A pivoting aircraft wing system according to claim 12, wherein each of the wing members is positioned at a sweep angle of about 10 degrees in an unswept position.

22. A pivoting aircraft wing system according to claim 12, wherein each of the wing members is capable of pivoting to at least a sweep angle of 70 degrees.

23. A method of pivoting aircraft wings, the method comprising:

provuding a carry-through structure carried by a fuselage member;

providing a pair of spar boxes, wherein each of the spar boxes is pivotally connected to the carry-through structure and extends longitudinally within a respective one of a pair of wing members; and pivoting each of the wing members about a virtual axis of rotation to predetermined sweep angles.

24. The method according to claim 23, wherein pivoting comprises pivoting about a virtual axis of rotation defined by a plurality of bearings disposed within respective bearing races defined between the carry-through structure and the spar boxes.

25. The method according to claim 23, wherein pivoting comprises actuating each of the wing members to pivot approximately simultaneously.

26. The method according to claim 23, wherein pivoting comprises pivoting each of the wing members to a sweep angle of at least 70 degrees.

* * * * *

UNITED STATES PATENT AND TRADEMARK OFFICE
CERTIFICATE OF CORRECTION

| | |
|---|---|
| PATENT NO. | : 7,051,974 B2 |
| APPLICATION NO. | : 10/864114 |
| DATED | : May 30, 2006 |
| INVENTOR(S) | : Stuhr |

It is certified that error appears in the above-identified patent and that said Letters Patent is hereby corrected as shown below:

Column 10,

Line 62, "car-through" should read --carry-through--.

Signed and Sealed this

Twenty-first Day of November, 2006

JON W. DUDAS
*Director of the United States Patent and Trademark Office*